United States Patent [19]
Cederblad et al.

[11] Patent Number: 5,885,686
[45] Date of Patent: Mar. 23, 1999

[54] BICOMPONENT ELASTOMERIC NETTING

[75] Inventors: Hans O. Cederblad, Minnetonka; Jan D. Seppala, St. Paul, both of Minn.

[73] Assignee: Leucadia, Inc., New York, N.Y.

[21] Appl. No.: 684,415

[22] Filed: Jul. 19, 1996

Related U.S. Application Data

[63] Continuation-in-part of Ser. No. 296,635, Aug. 26, 1994.

[51] Int. Cl.$^6$ ........................................................ B32B 5/12
[52] U.S. Cl. .............................. 428/107; 428/105; 442/1; 442/50; 442/329
[58] Field of Search ..................................... 442/182, 213, 442/1, 50, 328, 329; 428/105, 107

[56] References Cited

U.S. PATENT DOCUMENTS

| | | |
|---|---|---|
| 504,537 | 9/1893 | Amata . |
| 2,919,467 | 1/1960 | Mercer . |
| 3,051,987 | 9/1962 | Mercer . |
| 3,070,840 | 1/1963 | Mercer . |
| 3,252,181 | 5/1966 | Hureau . |
| 3,723,218 | 3/1973 | Gaffney . |
| 3,791,784 | 2/1974 | Arechavaleta . |
| 3,867,242 | 2/1975 | Miller . |
| 3,874,834 | 4/1975 | Arechavaleta . |
| 4,063,995 | 12/1977 | Kerpman . |
| 4,107,371 | 8/1978 | Dean . |
| 4,241,123 | 12/1980 | Shih . |
| 4,329,309 | 5/1982 | Kelly . |
| 4,351,872 | 9/1982 | Brosseau et al. . |
| 4,381,326 | 4/1983 | Kelly . |
| 4,460,633 | 7/1984 | Kobayashi et al. . |
| 4,469,739 | 9/1984 | Gretzinger et al. . |
| 4,606,964 | 8/1986 | Wideman . |
| 4,636,419 | 1/1987 | Madsen et al. . |
| 4,673,015 | 6/1987 | Andreasson . |
| 4,728,565 | 3/1988 | Fontana . |
| 4,775,579 | 10/1988 | Hagy et al. . |
| 4,980,227 | 12/1990 | Sekiguchi et al. . |
| 4,999,232 | 3/1991 | Levan . |
| 5,458,944 | 10/1995 | Austin . |

FOREIGN PATENT DOCUMENTS

| | | |
|---|---|---|
| 0 046 402 A2 | 2/1982 | European Pat. Off. . |
| 0 097 496 A2 | 1/1984 | European Pat. Off. . |
| 2160720 | 6/1973 | France . |
| 1 504 629 | 10/1969 | Germany . |
| 3622740 A1 | 1/1988 | Germany . |
| 41 38 577 A1 | 5/1993 | Germany . |
| 955134 | 9/1973 | Italy . |
| 7706855 | 6/1977 | Netherlands . |
| 2 156 273 | 10/1985 | United Kingdom . |
| WO 93/16870 | 9/1993 | WIPO . |
| WO 97/11839 | 4/1997 | WIPO . |

OTHER PUBLICATIONS

Abstract from Database WPI, Week 9306, Derwent Publications Ltd., London, GB: AN 93–048265, XP002047040 & JP 04 371 834 A (Nippon Petrochemicals Co Ltd), 24 Dec. 1992, See Abstract.

*Primary Examiner*—James J. Bell
*Attorney, Agent, or Firm*—Vidas, Arrett & Steinkraus

[57] ABSTRACT

Bicomponent elastomeric extruded netting having bidirectional elasticity is formed of one set of relatively elastic, extruded strands in one direction and another set of transverse, relatively elastic extruded strands. The strands are formed of relatively elastic resins.

21 Claims, 3 Drawing Sheets

BICOMPONENT ELASTOMERIC NETTING

This application is a Continuation-In-Part of U.S. patent application Ser. No. 08/295,635 filed Aug. 26, 1994.

BACKGROUND OF THE INVENTION

1. Field Of The Invention

This invention relates to plastic netting, and more particularly to an extruded bicomponent elastomeric netting having bidirectional elasticity, that is elasticity in both the machine direction and the transverse direction. Such netting is sometimes referred to as fiber formed netting because the strands making up the netting are individually extruded from a die.

2. Description Of The Related Art

For purposes of the present invention, the terms "cross machine direction" and "transverse direction" are synonymous and referred to as "TD", as are the terms "longitudinal direction" and "machine direction", referred to as "MD". Current production of elastomeric roll goods, such as scrims, sheets, films, foams, nettings, nonwovens, fibers, threads and the like are basically isotropic, exhibiting essentially the same properties in all directions of their two dimensional plane. However, in many applications, different elastomeric properties are desired in different directions, i.e., in the MD and TD. Although numerous patents exist describing netting, woven and non-woven fabrics, meshes and chain nets with bicomponent materials, they do not provide any suggestion to modify the prior art such as is done in the present invention with respect to extruded plastic net. Existing technology does not include an extruded bicomponent elastomeric netting with bidirectional elasticity. A bicomponent netting is a netting in which the two sets of strands (MD and TD strands) are made up and fed by two separate (and possibly different) polymer melt streams.

Nets, wovens and nonwoven reinforcements made of more than one material are disclosed in U.S. Pat. No. 4,636,419 to Madsen, U.S. Pat. No. 4,241,123 to Shih, and U.S. Pat. No. 4,460,633 to Kobayashi et al. In addition, a netting die fed by two separate polymer streams is disclosed in U.S. Pat. No. 3,791,784 to Arechavaleta.

U.S. Pat. No. 4,636,419 issued to Madsen et al. on Jan. 13, 1987 discloses a "Net and Method of Producing Same" which employs a combination of side by side extrusion streams, transversal embossment, and splitting to produce netting composed of a regular array of longitudinal ribbon-formed continuous polymer filaments and a regular array of transverse stems or strands of a different polymer matter. It is disclosed that the use of two different polymer substances in two directions affords netting of interesting and unusual properties (col. 2, lines 12–25 and 30–31). In Example 1, the cross machine component comprises Nylon 6 and the machine direction component comprises polypropylene (col. 11, lines 13–31). It is disclosed that elastomeric netting may be prepared by the method of this patent, and preferred materials as well as a suitable application for such netting is disclosed (col. 9, line 67 through col. 10, line 7). Bidirectional elasticity in net as-extruded is neither disclosed nor suggested.

U.S. Pat. No. 4,241,123 issued to Shih on Dec. 23, 1980 discloses non-woven netting wherein a first group of melting monofilaments are die extruded and a second group of monofilaments or a yarn is crossed, pressed, and welded to form a welded plastic netting (col. 3, lines 8–12).

U.S. Pat. No. 4,460,633 issued to Kobayashi et al. on Jul. 17, 1984 discloses a nonwoven reinforcement for resinous composites made of bundles of non-twist or soft twist yarns as warps on both sides of bundles of non-twist or soft twist yarns as wefts, warps and wefts being bonded by an adhesive agent impregnated into the wefts.

U.S. Pat. No. 4,980,227 issued to Sekiguchi et al. on Dec. 25, 1990 discloses a stiff, netlike sheet of heat bonded five layer and three layer polyolefin yarns which exhibits retention of its sheet-like shape due to its stiffness. Although heat bonding of polyolefin materials is mentioned, neither an extruded net nor the use of another material to produce bidirectional elasticity is disclosed or suggested.

U.S. Pat. No. 3,791,784 to Arechavaleta discloses an extrusion die fed by two separate polymer streams. Although Arechavaleta suggests that two different materials may be extruded, it is not suggested that the die be used to produce a resulting netting structure which will possess good strand to strand bond, uniform transverse direction strand spacing, or a high transverse direction packing density, i.e., transverse direction strandcount, nor is a net having bidirectional elasticity suggested.

Fabrics, meshes, chain nets, and support materials with elastic properties are disclosed in U.S. Pat. No. 4,107,371 issued to Dean, U.S. Pat. No. 4,673,015 issued to Andreasson, U.S. Pat. No. 4,728,565 issued to Fontana, U.S. Pat. No. 4,469,739 issued to Gretzinger, and U.S. Pat. No. 4,351,872 issued to Brosseau et al. These products are expensive to produce, and are significantly different from a fiber formed extruded netting product.

U.S. Pat. No. 4,107,371 issued to Dean on Aug. 15, 1978 discloses a fabric woven of plastic-coated yarn and polymer strands that is relatively stiff in one direction and relatively flexible in the other direction. This differs from the present invention in that it does not disclose, teach or suggest making an extruded net from two different polymer compositions as between crossing strands.

U.S. Pat. No. 4,351,872 issued to Brosseau et al. on Sep. 28, 1982 discloses a unidirectional stretch mesh laminate used in an orthopaedic traction harness. A commercially available DuPont unidirectional stretch mesh is discussed at col. 3, lines 12–18 as a component of the invention. No patent was found disclosing said mesh.

U.S. Pat. No. 4,469,739 issued to Gretzinger on Sep. 4, 1984 discloses an oriented woven furniture support material made in part from an elastomer monofilament and in part from polymeric material or natural yarn. Unlike the extruded bicomponent elastomeric netting of the present invention, this material is woven rather than a fiber formed extruded product, and is not of a polymeric material.

U.S. Pat. No. 4,673,015 issued to Andreasson on Jun. 16, 1987 discloses a chain net which may include links of elastically deformable material. It is suggested that although warp and weft strands are usually made of links of similarly elastic material, the weft strands may alternatively be made of other material (col. 2, lines 49–64). This patent does not disclose an extruded net.

U.S. Pat. No. 4,728,565 issued to Fontana on Mar. 1, 1988 discloses an elastic support member for supporting stuffing of furniture pieces comprising an elastic net or belt formed of a net or honeycomb fabric or a woven fabric comprised of rubber threads arranged in at least one of the transverse and longitudinal directions. This patent is an improvement of Italian Patent No. 955,134. Although the appearance of rubber threads in at least one direction suggests elasticity, this patent neither discloses nor suggests an extruded net as in the presently disclosed invention.

The art described in this section is not intended to constitute an admission that any patent, publication or other information referred to herein is "prior art" with respect to this invention, unless specifically designated as such. In addition, this section should not be construed to mean that a search has been made or that no other pertinent prior art information exists.

SUMMARY OF THE INVENTION

The present invention is an extruded bicomponent elastomeric netting having bidirectional elasticity, i.e., in the MD and TD. It is economical to produce. The bicomponent netting of the present invention may be produced by an extrusion die fed by two separate polymer streams. Such a netting is a nonwoven employing a relatively elastic strand material in one direction (MD) and a relatively elastic transverse strand material in the opposite direction (TD). Any combination of resins with an elastomeric resin blend may be used, as long as the two types of resin strands are compatible from processing and rheological standpoints. For example the strands of the two resin streams should show good joint bond strength.

DESCRIPTION OF THE PREFERRED EMBODIMENTS

Figure 1:
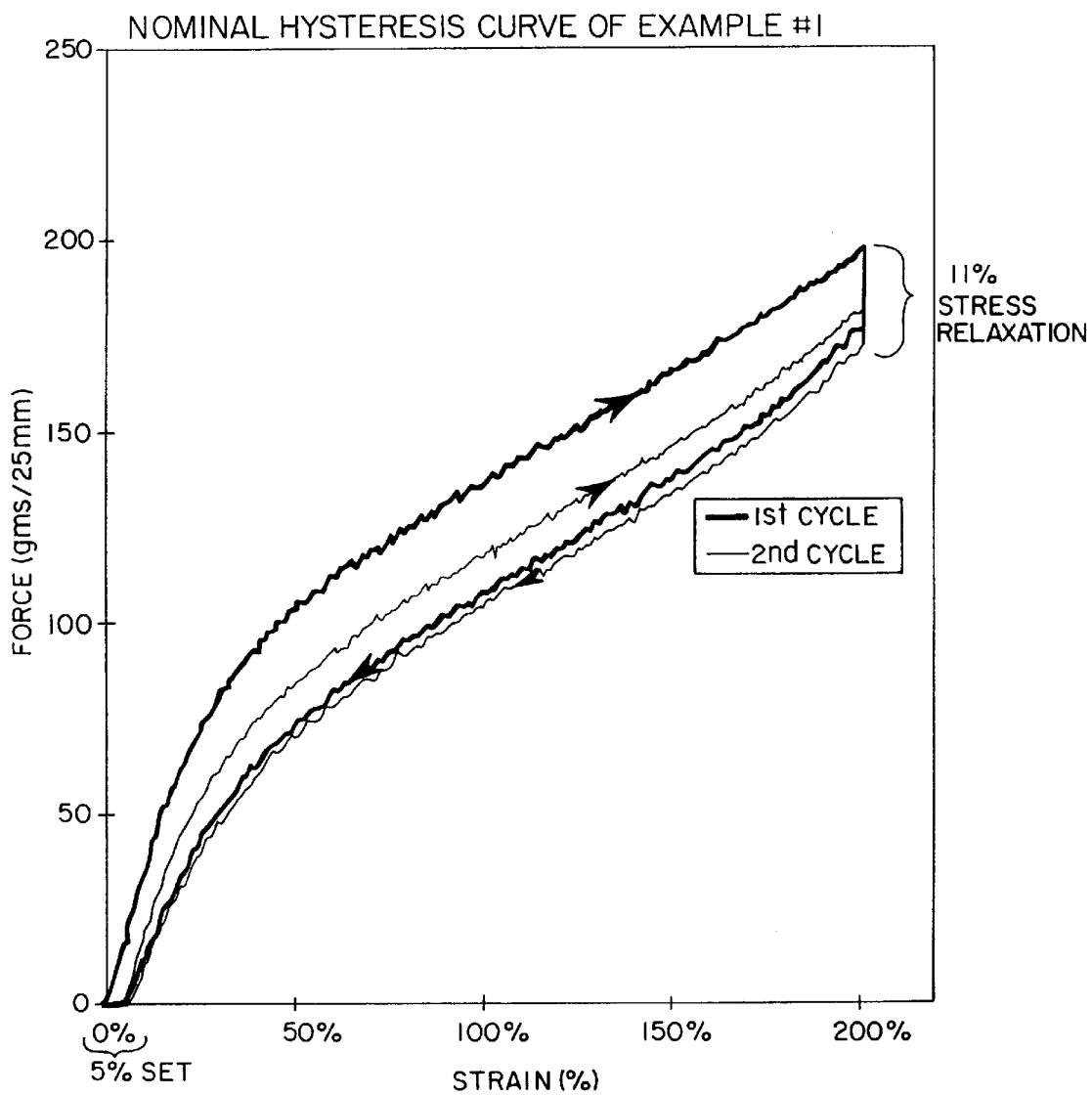
FIG. 1 is a graph showing a nominal hysteresis curve for the netting of Example #1.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

The above-identified parent patent application relates to a netting with unidirectional elastomeric properties, either in the machine direction (MD) or in the transverse direction (TD). There is a market need for several types of "hybrid" products, where various degrees of elastomeric properties are desired in both strand directions. This application is aimed at covering these "hybrid" product types. The following are examples of product types and requirements where a "hybrid" product is desirable.

When different degrees of elastomeric performance is required in the two strand directions. For example, one product may require a high elastic force at a low elongation in one direction and a low elastic force at a high elongation in the other direction. Another way to describe the performance difference is to say that the two strand directions' hysteresis curves are different.

When the non-elastic strands must be soft so that, when cut, these strand ends are soft and non-irritating to the touch. Soft materials tend to be highly elastic, thus, elastic strands in both directions are desirable.

In general, the bicomponent process provides several advantages over most other netting processes when producing all-elastomeric nettings.

The use of two independent polymer flows allows the use of two tailor-made elastomeric resin blends for the two strand directions. This results in the production capability of a very broad range of product types, both in terms of physical properties differentiation between the two sets of strands and in terms of the processible range of products in extrusion.

The strand crossover area (the joint) can be controlled. Specifically, the joint size can be altered depending on the amount of joint strength required; the joint can be made essentially two-planar, and the joint geometry can be controlled better than with most other netting processes. Small joints result in a greater "free" strand length, which allow elastic forces to flow through the joints essentially "undiluted". The larger the ratio of "free strand length" to "joint length", the better the elastomeric properties for a given material. This is so, as the joint typically restricts stretching in the area where it is bonded to a crossing strand. Similarly, in a two-planar joint, there is less interference from the transverse strand, and less transfer of the linear force into its crossing strand, than is the case with a one-planar joint.

A unique feature of the "hybrid" product of this invention is the ability to fine-tune the exact desired elastomeric performance in the two strand directions based on: the composition of the two elastomeric resin blends, the controlled strand crossover design, and the different degrees of melt orientation.

Figure 2:
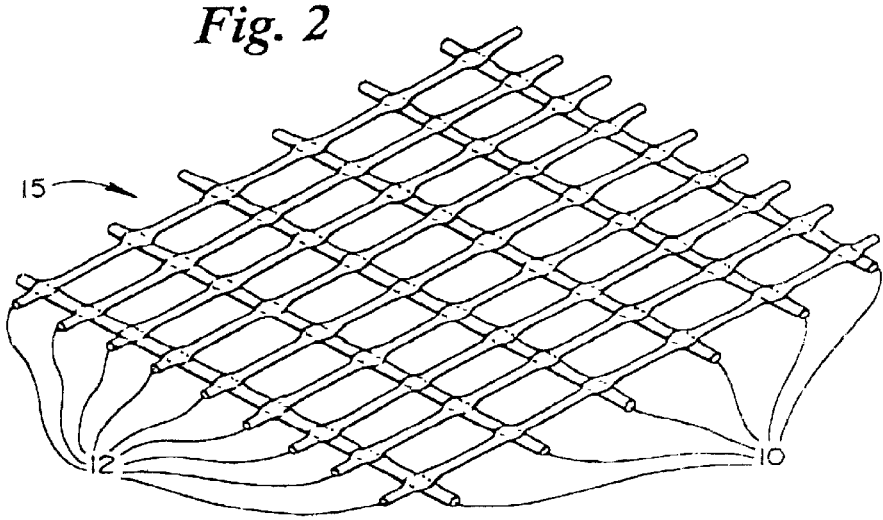
FIG. 2 is a perspective view of one netting of the present invention.

Referring now to FIG. 2, the bicomponent elastomeric netting shown is extruded and consists of strands of a relatively elastic material 10 extending in one direction and strands 12 of an elastic material extending in a crosswise direction. The strands are extruded polymeric elongate members which cross and intersect during extrusion to form two-planar joints as shown and consequently to form the net-like structure.

However, in its broad context, the elastic strand material may be any extrudable material, such as for example the following listed thermoplastic elastomers (TPE'S) used simply or in the form of various composition blends.

There are generally considered to be six classes of commercially available TPE's. Examples are:

Styrenic Block Copolymers (SBC's)

The various SBC's include:
Styrene-Butadiene-Styrene (SBS)
Styrene-Isoprene-Styrene (SIS)
Styrene-Ethylene/Butylene-Styrene (SEBS)
Styrene-Ethylene/Propylene-Styrene (SEPS) (uncommon)

Tradenames and producers include Vector (SBS and SIS) by Dexco Polymers, Kraton (SBS, SIS and SEBS) by Shell Chemical Co., Finaprene (SBS) by Fina Oil & Chemical, and Europrene (SBS and SIS) by EniChem Elastomers. Only Shell makes the SEBS resin (Kraton G).

Thermoplastic Olefins and Blends (TPO's)

Tradenames and suppliers of traditional TPO's include Polytrope (a blend of polypropylene and EPDM, a rubber) by A. Schulman and Telcar (also a blend of polypropylene and EPDM) by Teknor Apex. These are propylene/EPDM block copolymers. EPDM is Ethylene Propylene Diene Monomer.

A new subclass of TPO's are the VLDPE's (very low density), copolymers with a density of about $\leq 0.880$ g/cm$^3$. The elasticity of polyethylenes increases with decreasing density. Tradenames and suppliers of these include Exact by Exxon Chemical Co. and Engage by Dow Plastics.

Elastomeric Alloys

This class of TPE's consists of mixtures using two or more polymers that have received proprietary treatment to give them properties significantly superior to the simple blends of the same constituents. The two basic types are: Thermoplastic vulcanites (TPV's), such as Santoprene (polypropylene and crosslinked EPDM) by Advanced Elastomer Systems, Geolast (polypropylene or nitride rubber) by Monsanto and melt-processible rubbers (MPR's), such as Alcryn (polyvinylidene chloride and crosslinked polyvinylacetate copolymer) by DuPont Co.

Thermoplastic Polyurethanes (TPU's)

Tradenames and suppliers include Pellethane (polyurethane with polyester, polyether, or polycaprolactone copolymers) by Dow Chemical and Estane by B.F. Goodrich.

Thermoplastic Copolyesters

Tradenames and producers include Hytrel (polyetherester copolymer) by DuPont Co., and Arnitel (polyetherester copolymer) by DSM Engineering Plastics.

Thermoplastic Polyamides

Pebax (a block copolymer of polyamide and polyether) are made by Elf Atochem.

For elastic strand material the Kraton D grade class of styrene butadiene styrene (SBS) resins may be used. Kraton® D grade class resin, such as D-1102 or D-2104 is available from Shell Oil Company, Houston, Tex. Also, the Vector brand extrusion grade resins such as Vector 8550D (SBS), 4211D styrene isoprene styrene (SIS) and 8508D (SBS) may be used. Suitably the elastic strand material may be a blend of SBS and SIS resins, which blends may vary widely as to relative amounts.

Additional resins such as processing aid resins may be added to the elastic strand material in small amounts, such as about 5–30 parts, to improve processability and to enhance physical properties of the elastic strand material. Improvement in processability is for example evidenced by an increase in melt strength, a reduction in viscosity, the ability to draw down strands, and/or the netting's resistance to blocking during processing. Physical properties enhanced include improved melt strength, and elastic properties such as stress relaxation, set and creep These processing aid resins include isotatic polypropylene, polyethylene, amorphous polypropylene, polybutylene, ethylene/vinyl acetate copolymer, ethylene/methyl acetate copolymer, polystyrene and the like. Preferred resins are polystyrene, polyethylene, polybutylene, polypropylene, ethylene vinyl acetate (EVA) and ethylene methyl acetate (EMA), and the most preferred resin is polystyrene. The relative parts ratios may vary.

Depending on the elastomeric blend used, a slip additive may also be added in an effective amount to prevent blocking, which occurs when the strands of net become tacky and stick to themselves as well as the web handling equipment. Examples of such slip additives are modified fatty acid esters or fatty acid amides.

A specific example of elastic strand material is a blend of SIS/SBS and additive as set forth below:

| | |
|---|---|
| 60 parts | SIS |
| 40 parts | SBS |
| 25 parts | Processing Aid Resins. |

EXAMPLE #1

A bicomponent netting with an MD strandcount of 12 per inch, and a TD strandcount of 7 per inch, weighing 24 PMSF (pounds per 1,000 square feet) is extruded. The netting has the following resin compositions:

MD Resin: 75% oiled SBS (Vector 7400 D from Dexco Polymers).
20% polystyrene (Styron 678C from Dow Plastics).
5% antioxidant masterbatch (a masterbatch containing 90% Styron 678C from Dow Chemical Co., Midland, Mich., 5% Irganox 1010 for Ciba-Geigy Corporation, Terrytown, N.Y., 5% Sandostab P-EPQ from Clariant Corporation, Charlotte, N.C.).

TD Resin: 85% oiled SBS (see above).
12% polystyrene (see above).
3% antioxidant masterbatch (see above).

The product has the following TD properties:
First cycle load force @ 200% elongation: 200 g/in.
First cycle stress relaxation @ 200% elongation and 30 seconds stress relaxation time: 11%.
First cycle set: 5%

A 2-cycle hysteresis curve showing the TD properties is shown in FIG. 1.

The MD resin blend contains a high percentage of an oiled-SBS resin in order to promote strand softness, so that the cut strand ends are soft and not irritating to the touch (in skin contact).

This is an example of product type B (above), in which the non-elastic strands are made soft and, when cut, non-irritating to the skin.

EXAMPLE #2

A bicomponent netting with an MD strand count of 12 per inch, and a TD strandcount of 5.5 per inch, weighing 15 PMSF (pounds per 1,000 square feet) is extruded. The netting has the following resin compositions:

MD Resin: 85% oiled SBS (Vector 7400D from Dexco Polymers of Houston, Tex.).
12% polystyrene (Styron 678C from Dow Chemical Co.).
3% antioxidant masterbatch (a masterbatch containing 90% Styron 678C from Dow Chemical Co., 5% Irganox 1010 from Ciba-Geigy, 5% Sandostab P-EPQ from Clariant).

TD Resin: 50% oiled SBS (see above).
47% mVLDPE (Exact 4049 from Exxon Chemical of Houston, Tex.).
3% antioxidant masterbatch (see above).

The product has the following MD properties:
First cycle load force @ 400% elongation: 425 g/in.
First cycle stress relaxation @ 400% elongation and 30 second stress relaxation time: 28%.
First cycle set following 400% elongation: 15%.

The product has the following TD properties:
First cycle load force @ 180% elongation: 200 g/in.
First cycle stress relaxation @ 180% elongation and 30 second stress relaxation time: 16%.
First cycle set following 180% elongation: 11%.

This is an example of product A above in which different elastomeric properties are specified for the two strand directions.

EXAMPLE #3

A bicomponent netting with an MD strandcount of 8 per inch, and a TD strandcount of 7 per inch, weighing 23 PMSF (pounds per 1,000 square feet) is extruded. The netting having the following resin compositions:

MD Resin: mVLDPE (Exact 4041 from Exxon Chemical; resin density 0.878 g/cm$^3$).

TD Resin: 85% oiled SBS (Vector 7400D from Dexco Polymers).

12% polystyrene (Styron 678C from Dow Plastics).

3% antioxidant masterbatch (a masterbatch containing 90% Styron 678C from Dow Plastics, 5% Irganox 1010 from Ciba-Geigy, 5% Sandostab P-EPQ from Clariant).

This product has the following TD properties:

First cycle load force @ 200% elongation: 215 g/in.

Second cycle unload force @ 50% elongation: 70 g/in.

First cycle stress relaxation after 30 seconds @ 200% elongation: 12.5%.

This is an example of a product with a multiple polymer composition in one direction (TD), and a single polymer composition in the other direction (MD). Single polymer composition refers to the use of any one polymer such as a homopolymer, copolymer, a block copolymer or the like. A multiple polymer composition refers to one which contains two or more single polymers.

EXAMPLE #4

A bicomponent netting with an MD strandcount of 12 per inch, and a TD strandcount of 7 per inch, is extruded. The netting has the following resin compositions.

MD Resin: Polyether-ester copolymer (Arnitel EB 400 natural from DSM Engineering Plastics).

TD Resin: Polyether-ester copolymer (Hytrel 3078 from DuPont Co.).

The product has the following MD properties:

First cycle load force @ 200% elongation: 4,900 g/2 in.

First cycle 30 second stress relaxation @ 200% elongation: 30%.

First cycle set after 200% elongation: 100%.

The product has the following TD properties:

Force @ break: 4,800 g/3 in.

Elongation @ break: 720%.

This is an example of a product with a single polymer composition in both the MD and TD directions.

EXAMPLE #5

A bicomponent netting with an MD strandcount of 12 per inch, and a TD strandcount of 7 per inch, is extruded. The netting has the following resin compositions:

MD Resin: mVLDPE (Exact 4041 from Exxon Chemical; density 0.878 g/cm$^3$).

TD Resin: mVLDPE (Exact 4049 from Exxon Chemical; density 0.873 g/cm$^3$).

The product has the following MD properties:

MD force @ 25%–50%–75%–100% elongation: 900–1020–1080–1140 g/2 in.

MD set @ 25%–50%–75%–100% elongation: 1.2–4.9–11–24%.

The product has the following TD properties:

TD force @ 50% elongation: 550 g/2 in.

TD set @ 25%–50%–75% elongation: 1.4–4.4–8.5%.

This is an example of a product with a single polymer composition in both the MD and TD directions.

EXAMPLE #6

A bicomponent netting with an MD strandcount of 12 per inch, and a TD strandcount of 7 per inch, is extruded. The netting has the following resin compositions:

MD Resin: mVLDPE (Exact 4041 from Exxon Chemical; density 0.878 g/cm$^3$).

TD Resin: PP/crosslinked EPDM elastomeric alloy (Santoprene 201-73 from Advanced Elastomer Systems).

The product has the following MD properties:

MD force @ 25%–50%–75%–100% elongation: 980–1140–1230–1300 g/2 in.

MD set @ 25%–50%–75%–100% elongation: 1.5–5.7–12–22%.

The product has the following TD properties:

TD force @ 50% elongation: 350 g/2 in.

TD set @ 25%–50%–75% elongation: 3.7–9.4–16%.

This is an example of a product with a single polymer composition in both the MD and TD directions.

Figure 3:
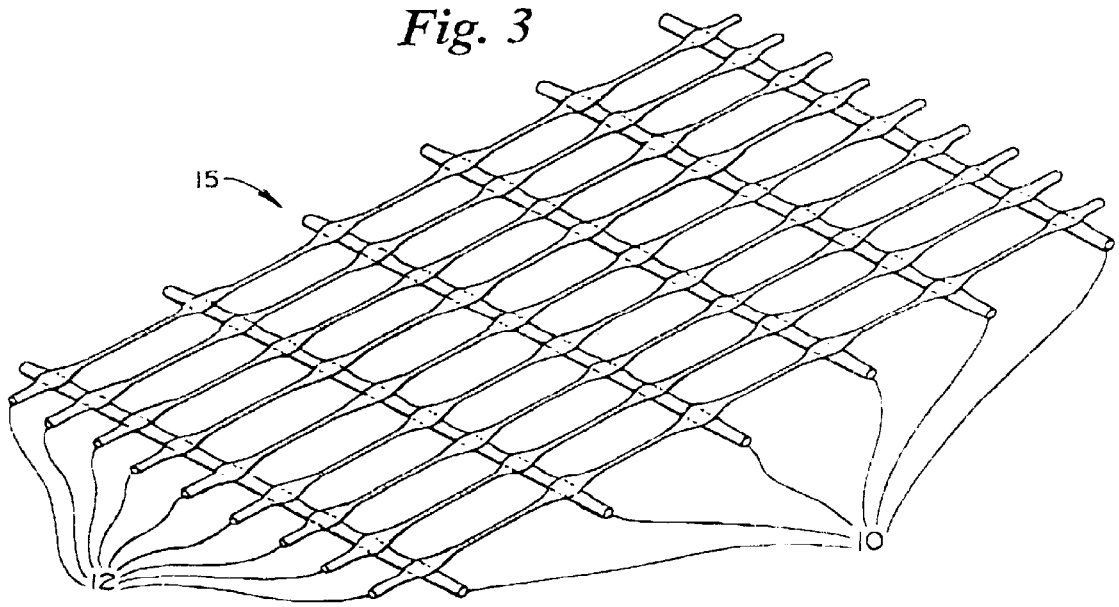
FIG. 3 is the netting of FIG. 2 shown with the elastic strands stretched in one direction.
Figure 4:
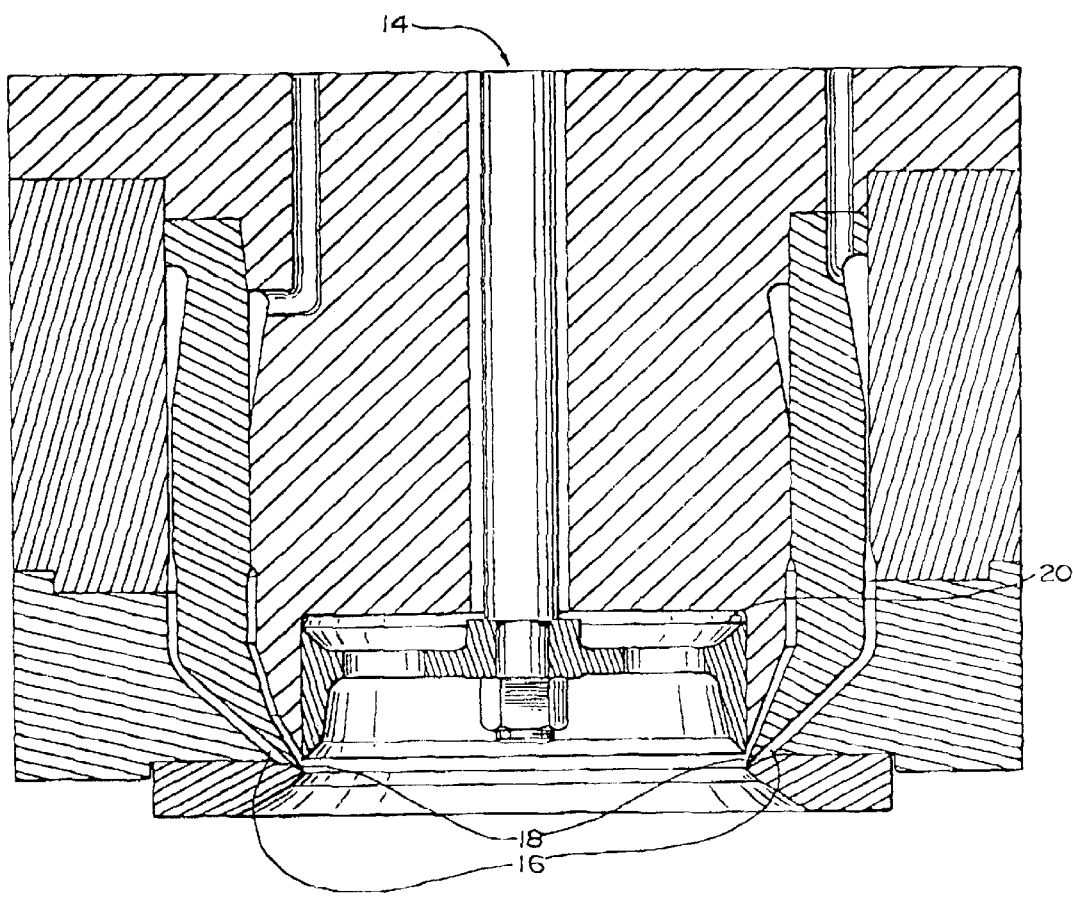
FIG. 4 is a cross sectional view taken through the vertical axis of an extrusion die for making the netting of the present invention.

Referring now to FIGS. 2, 3 and 4, an extrusion die 14 is shown in FIG. 4 for forming the bicomponent netting product. The machine direction strands (MD) produced by such a die are shown at 12 in FIGS. 2 and 3 in a net generally designated as 15 in FIGS. 2 and 3. The material is supplied to the die under pressure and is discharged continuously from cavity 16 through a plurality of openings to form the MD strands. The openings do not appear in the cross section shown in FIG. 4. The transverse direction strands (TD) are shown at 10 in FIGS. 2 and 3. The material is also supplied to the die under pressure and intermittently discharged through slit 18 shown partially open in FIG. 4 which is opened and closed by the reciprocating movement of piston 20. When piston 20 is moved to open slit 18 the elastomer flows out to form transverse TD strands 10 in the form of a closed ring intersecting with all of the MD strands. The netting is extruded in the form of a cylinder or tube, which is then cut lengthwise and flattened to form a continuous sheet as shown in FIGS. 2 and 3. The strands (either or both MD and TD) may optionally be stretch modified in a second processing step.

As can be seen in FIG. 3, strands 12 are elastic and may be stretched as are strands 10 (stretch not shown).

A high bond strength is particularly required if the extruded bicomponent netting is to be stretch modified in a second processing step. In this process step, high forces are transferred and distributed through the netting joint to and from netting strands in all directions by stretching. Without a good strand to strand bond at the joint, the product may delaminate or rupture. The resulting product can consequently be made with uniform transverse direction strand spacing, high transverse direction strandcount, and is both uniaxially and biaxially orientable and extensible. Further information regarding stretch modification may be found in U.S. patent application Ser. No. 08/533,366, filed Sep. 25, 1995, entitled *STRETCH MODIFIED ELASTOMERIC NETTING*, the entire content of which is incorporated herein by reference.

As is clear from the above description, netting of the invention may be comprised of strands in both directions which are made up of single polymer compositions and in which the two sets of strands may be of the same or different composition. Alternatively, the two sets of strands may be of a multiple polymer composition, both sets being of the same or different blends. Also, one set of strands may be of a single polymer composition while the other set is of a multiple polymer composition. In such a case, preferably the multiple polymer composition will be in the TD strands and the single polymer composition will be in the MD strands, although this is not critical and the opposite arrangement is also possible. Lastly, either or both sets of strands may be stretch modified.

This completes the description of the preferred and alternate embodiments of the invention. Those skilled in the art may recognize other equivalents to the specific embodiment described herein which equivalents are intended to be encompassed by the claims attached hereto.

What is claimed is as follows:

1. A bicomponent elastomeric extruded netting having bidirectional elasticity, said bicomponent elastomeric extruded netting comprising one set of extruded strands in one direction consisting essentially of a first elastic resin component and another set of transverse extruded strands consisting essentially of a second elastic resin component.

2. The netting of claim 1 wherein at least some of the extruded strands in at least one direction are of a styrenic block copolymer composition.

3. The netting of claim 2 wherein at least one of the elastic resin components is a styrene-butadiene-styrene resin.

4. The netting of claim 2 wherein at least one of the elastic resin components is a styrene-isoprene-styrene resin.

5. The netting of claim 2 wherein the polymer composition in at least one of the strands is a blend of resins.

6. The netting of claim 2 wherein at least one of the elastic resin components is a blend of SBS and SIS.

7. The netting of claim 1 wherein the strand compositions of both sets of strands are the same.

8. The netting of claim 7 wherein the first elastic resin component is of a single polymer composition and the second resin component is of a single polymer composition.

9. A bicomponent elastomeric extruded netting having bidirectional elasticity, said bicomponent elastomeric extruded netting comprising a first set of elastomeric extruded strands extending in a first direction and a second set of elastomeric extruded strands extending in a substantially transverse direction, the first set of strands being comprised of a first polymer composition and the second set of strands being comprised of a second polymer composition, the first polymer composition different from the second polymer composition so as to exhibit property differentiation.

10. The netting of claim 9 wherein at least one of the polymer compositions is an elastic resin which is comprised of a blend of SIS and SBS.

11. The netting of claim 9 wherein at least one of the polymer compositions is an elastic resin which further includes a processing aid resin selected from the group consisting of isotatic polypropylene, polyethylene, amorphous polypropylene, polybutylene, ethylene/vinyl acetate copolymer, ethylene/ethyl acrylate copolymer, ethylene/methyl acrylate copolymer, ethylene/methyl acetate copolymer, polystyrene and mixtures thereof.

12. The netting of claim 11 wherein the elastic resin includes about 5–30 parts of the processing aid resin.

13. The netting of claim 12 wherein the parts are about 25.

14. The netting of claim 11 wherein the elastic resin includes about 5–30 parts of polystyrene.

15. The netting of claim 11 wherein the elastic resin includes an amount of a slip agent.

16. The netting of claim 9 wherein the first polymer composition is a single polymer composition and the second polymer composition is a single polymer composition.

17. The netting of claim 9 wherein the strands of at least one set are of a multiple polymer composition.

18. The netting of claim 2 wherein at least some of the extruded strands in both directions are of a styrenic block copolymer composition.

19. The netting of claim 1 wherein the first elastic resin component is of a single polymer composition and the second elastic resin component is of a multiple polymer composition.

20. The netting of claim 1 wherein the first elastic resin component is of a multiple polymer composition and the second elastic resin component is of a multiple polymer composition.

21. The netting of claim 1 wherein the first elastic resin component and the second elastic component differ.

* * * * *

UNITED STATES PATENT AND TRADEMARK OFFICE
CERTIFICATE OF CORRECTION

PATENT NO. : 5,885,686

DATED : March 23, 1999

INVENTOR(S) : Hans O. Cederblad, Minnetonka; Jan D. Seppala, St. Paul, both of Minnesota.

It is certified that error appears in the above-identified patent and that said Letters Patent is hereby corrected as shown below:

On the title page, under U.S. Patent Documents please delete "504,537" and insert --5,045,377--.

Column 3, line 52, please insert --A.-- before When.

Column 3, line 59, please insert --B.-- before When.

Column 5, line 9, please delete "Polvurethanes" and insert --Polyurethanes--.

Signed and Sealed this

Tenth Day of August, 1999

*Attest:*

Q. TODD DICKINSON

*Attesting Officer*   *Acting Commissioner of Patents and Trademarks*